US010096260B2

(12) United States Patent
Togasaka

(10) Patent No.: US 10,096,260 B2
(45) Date of Patent: Oct. 9, 2018

(54) GOLF PLAY ASSISTING SYSTEM

(71) Applicant: Techno Craft Corporation Ltd., Niigata (JP)

(72) Inventor: Masanari Togasaka, Niigata (JP)

(73) Assignee: Techno Craft Corporation Ltd., Niigata (JP)

(*) Notice: Subject to any disclaimer, the term of this patent is extended or adjusted under 35 U.S.C. 154(b) by 118 days.

(21) Appl. No.: 15/265,484

(22) Filed: Sep. 14, 2016

(65) Prior Publication Data
US 2017/0084193 A1    Mar. 23, 2017

(30) Foreign Application Priority Data

Sep. 17, 2015  (JP) ................... 2015-184231

(51) Int. Cl.
*G06T 7/70* (2017.01)
*A63B 69/36* (2006.01)
*G06T 7/60* (2017.01)
*G06T 11/60* (2006.01)
*G09B 19/00* (2006.01)
*H04N 7/18* (2006.01)
*G06F 3/041* (2006.01)
(Continued)

(52) U.S. Cl.
CPC ......... *G09B 19/0038* (2013.01); *G06F 3/041* (2013.01); *G06T 7/60* (2013.01); *G06T 7/70* (2017.01); *G06T 11/00* (2013.01); *G06T 11/60* (2013.01); *G09B 5/02* (2013.01); *H04N 7/185* (2013.01); *G06T 2207/30221* (2013.01)

(58) Field of Classification Search
CPC .......... G06F 3/041; G06T 11/00; G06T 11/60; G06T 2207/30221; G06T 7/004; G06T 7/60; G09B 19/0038; G09B 5/02; H04N 7/185

USPC .......................................... 348/157; 473/131
See application file for complete search history.

(56) References Cited

U.S. PATENT DOCUMENTS 5,797,809 A * 8/1998 Hyuga ............... A63B 71/0669
                                                    340/323 R
6,638,173 B2 * 10/2003 Robinson ............... A63B 57/00
                                                    473/131

FOREIGN PATENT DOCUMENTS

JP        2007-164651 A      6/2007
JP         2014-14498 A       1/2014
(Continued)

OTHER PUBLICATIONS

Office Action issued in connection with corresponding Australian Patent Application No. 2016225940 dated Sep. 1, 2017.
(Continued)

*Primary Examiner* — Christopher S Kelley
*Assistant Examiner* — Kathleen M Walsh
(74) *Attorney, Agent, or Firm* — Akerman LLP

(57) ABSTRACT

Provided is a golf play assisting system enabling players to get an intuitive picture of the condition of the grain. When an image of a portion of a turf target is taken by a player to study the grain of the target turf by using an image-taking device of a mobile terminal, an image processing and analyzing unit performs image processing and image analysis against original image data captured thereby. As a result, symbolized images of the grain data, indicating a direction and inclination of the grain at each specific location in the turf target, are then displayed on a display unit of the mobile terminal on top of a processed image data visibly highlighting the grain of the target turf.

9 Claims, 5 Drawing Sheets

(51) Int. Cl.
    *G09B 5/02*        (2006.01)
    *G06T 11/00*       (2006.01)

(56)           References Cited

FOREIGN PATENT DOCUMENTS

| JP | 2014-014500 A |   | 1/2014 |
|----|---------------|---|--------|
| JP | 2014014498 A  | * | 1/2014 |
| KR | 20-2010-0006532 A | | 6/2010 |
| KR | 10-1088309 B1 |   | 11/2011 |
| KR | 101088309 B1  | * | 11/2011 |
| WO | 01/14021 A1   |   | 3/2011 |

OTHER PUBLICATIONS

Korean Search Report issued in connection with corresponding Korean Patent Application No. 10-2016-0117537 dated Sep. 20, 2017.
Anonymous: "Putt Reader—Android-Apps auf Google Play", Oct. 17, 2013, pp. 1-3 URL:https://play.google.com/store/apps/details?id=com.upsidetechnologies.puttreader&h1=de.
Anonymous: "GREEiN Golf Putting Reader—Android-Apps auf Google Play", Oct. 13, 2016 URL: https://play.google.com/store/apps/details?id =jp.co.tecraft.android.golf.greein2016&h1=de.
European Search Report issued in connection with corresponding European Application No. 16 18 9279.

* cited by examiner

GOLF PLAY ASSISTING SYSTEM

CROSS-REFERENCE TO RELATED APPLICATIONS

The present application claims priority to Japanese Patent Application No. 2015-184231, filed Sep. 17, 2015, the entirety of which is incorporated herein by reference.

BACKGROUND OF THE INVENTION

Field of the Invention

The present invention relates to a golf play assisting system for providing a golf player with helpful information for assisting him or her during a golf play, utilizing a mobile terminal.

Description of the Related Art

As such golf play assisting system, the present applicant once proposed a certain system, as disclosed in Japanese un-examined patent application publication No. 2014-14498, where an original image data of a turf or green shot by an image-taking device of a mobile terminal is processed using an image processing technique, and then the resultant processed image data is displayed on a display unit of the mobile terminal, thus enabling a golf player to accurately read a condition of the grain in great detail through a maximum use of mobile terminal.

Further, Japanese un-examined patent application publication No. 2007-164651 discloses an idea of producing such a realistic image of a green turf where two different textures of grain patterns are suitably blended in accordance with a shooting direction of a virtual camera.

Recently, however, there arises a new need to overcome the following drawbacks in such conventional golf play assisting systems.

Whilst the above-described conventional arts employ an image processor incorporated in the system thereof in order to produce a processed turf image where an original image is modified to highlight the grain in an easy-to-read manner, such images are nothing more than pseudo images that are obtained from original pictures, and hence players or users have difficulties getting an intuitive picture of the grain condition from those turf images shown on the display of the mobile terminal.

Also, Japanese un-examined patent application publication No. 2014-14498 discloses an idea of displaying slope information indicating a direction and/or slope of a turf surface as well as a processed turf image produced by an image processor. According to this conventional art, however, such turf image itself makes it still hard for players to read a grain condition in an intuitive manner if turf surface slope information is simply superimposed on the turf image. For this reason, players are not able to get an intuitive picture of the turf surface about where and how the turf surface is sloped, and what grain condition the turf surface has.

SUMMARY OF THE INVENTION

In view of the above-described drawbacks of the conventional arts, it is an object of the present invention to provide a golf play assisting system enabling golf players to get an intuitive picture of the grain condition of a green turf.

It is another object of the present invention to provide a golf play assisting system enabling golf players to get an intuitive picture of the slope of a green turf in addition to the grain condition thereof.

Problems to be Solved by the Invention

A first aspect of the present invention provides a golf play assisting system, using a mobile terminal equipped with an image-taking device and a display unit, including:

an image processing and analyzing unit that retrieves an original image data of a target turf from the image-taking device; allows an image of the target turf contained in the original image data to go through image processing and image analysis to obtain a processed image data of the target turf visibly highlighting a grain of the target turf; and obtains a grain data indicating directions and inclinations of the grain at two or more specific locations on the image of the target turf taken by the image-taking device; and a display controller superimposing the grain data on the processed image data with the grain data being symbolized and then displaying a resultant image data on the display unit of the mobile terminal.

A second aspect of the present invention provides the golf play assisting system according to the first aspect, further including a slope information generating unit generating turf slope information indicating a slope direction and angle defined by a surface of the target turf on which the mobile terminal is placed through data detected by an inclinometer incorporated within the mobile terminal, wherein the display controller is configured to symbolize the turf slope information at the two or more specific locations and display resultant symbolized information along with the grain data.

A third aspect of the present invention provides the golf play assisting system according to the second aspect, wherein the display controller is configured to switch, in response to an operation signal from an operating unit of the mobile terminal, a display mode of the display unit to either one of: a first mode displaying both the symbolized grain data and the symbolized turf slope information on the processed image data; and a second mode displaying only the symbolized grain data on the processed image data.

A fourth aspect of the present invention provides the golf play assisting system according to the first aspect, further including a position locating unit that locates: a measurement starting point corresponding to a point where the original image was taken by the mobile terminal; a nearest cup location as located nearest to the measurement starting point among a plurality of cups; and two or more measuring target points located along a straight line extending from the measurement starting point to the nearest cup location, through a positioning data obtained from a location detector incorporated in the mobile terminal upon retrieval of the original image data from the image-taking device, wherein the image processing and analyzing unit is configured to obtain the grain data at each of the measuring target points located by the position-locating unit as the specific locations.

A fifth aspect of the present invention provides the golf play assisting system according to the fourth aspect, wherein the display controller is configured to display an arrow as the symbolized grain data at each of the measuring target points such that a direction of the arrow indicates an orientation in which a turf grass extends and a length of the arrow indicates an inclination of the turf grass.

A sixth aspect of the present invention provides the golf play assisting system according to the fifth aspect, further including a slope information generating unit that sequentially retrieves positioning data from the location detector when the mobile terminal is placed on the surface of the target turf after the measuring target points are located by the position-locating unit; and generates turf slope information indicating a slope direction and angle defined by a surface of the target turf on which the mobile terminal is placed through data detected by an inclinometer incorporated within the mobile terminal if the mobile terminal is within a predetermined radius from any one of the measuring target points, wherein the display controller is configured to symbolize the turf slope information at each of the measuring target points and display resultant symbolized information along with the grain data.

A seventh aspect of the present invention provides the golf play assisting system according to the sixth aspect, wherein the display controller is configured to display one or more arrows arranged in a tandem array as the symbolized turf slope information at each of the measuring target points such that the direction of the arrows indicates slope direction of the turf surface viewed at each of the measuring target points and the number of the arrows indicates the slope angle of the turf surface.

An eighth aspect of the present invention provides the golf play assisting system according to the seventh aspect, wherein the display controller is configured to display the symbolized turf slope information and the symbolized grain data in different colors from each other.

A ninth aspect of the present invention provides the golf play assisting system according to the seventh aspect, further including; an acceleration information generating unit generating acceleration information at the time of putting, through data detected by the inclinometer when the mobile terminal is hit by a putter; and a putting assist information generating unit estimating, as putting assist information, a trajectory of a ball to be rolled toward the nearest cup location when the ball is putted from the measurement starting point, by utilizing information about green speed and compaction, in addition to the turf slope information, the acceleration information and the grain data, wherein the display controller is configured to simultaneously superimpose and display, on the processed image data, the symbolized nearest cup location; a straight line extending from the measurement starting point to the nearest cup location; the turf slope information and the grain data at each of the measuring target points; and the putting assist information indicating a trajectory of a ball to be rolled from the measurement starting point toward the nearest cup location.

A tenth aspect of the present invention provides the golf play assisting system according to the ninth aspect, further including a buffer to be hit by the putter, the buffer being mounted on the mobile terminal.

According to the first aspect of the present invention, when an image of a portion of a turf is shot by a player to study the grain of the turf by using an image-taking device of a mobile terminal, original image data of the shot image go through image processing and image analysis. Symbolized grain data, indicating a direction of the grain and an inclination of the grain at each specific location in the turf, are then displayed on a display unit of the mobile terminal on top of a processed image of the processed image data visibly highlighting the grain of the turf. Consequently, players are not only allowed to identify the characteristics of of the grain all over the turf, with a help of the processed image data on display unit, but also allowed to identify an orientation and inclination of the grain at any specific point of the turf surface with a help of the symbolized grain data, thus providing golf play assisting system capable of assisting players with getting an intuitive picture of the condition of the grain.

According to the second aspect of the present invention, players are allowed to identify, on the display unit, not only symbolized grain data, indicating a direction and inclinations of the grain at two or more specific locations, indicated on top of the processed image visibly highlighting the grain, but also turf slope information indicating a slope direction and angle defined by a surface of the target turf at the two or more specific locations. Consequently, there is provided a golf play assisting system enabling players to get an intuitive picture of the slope of the turf slope as well as the condition of the grain.

According to the third aspect of the present invention, display mode of the display unit is allowed to be switched to either one of a first mode and a second mode, in accordance with their skill levels of players.

According to the fourth aspect of the present invention, the position-locating unit can immediately identify a cup nearest to the player by using positioning data imported from a location detector, each time an image of the turf surface is shot by an image-taking device. Also, with a help of the symbolized images of the grain data, players can intuitively get a clear picture of the grain with respect to a direction and/or inclination thereof at each of the measuring target points, as well as the condition of the grain at other points than the measuring target points with a help of a processed image displayed in the background.

According to the fifth aspect of the present invention, players can immediately recognize a condition of the grain, at each of the measuring target points located along a line extending from the measurement starting point to the nearest cup location, by an image of an arrow where a longer dashed line thereof denotes a steeper grain inclination and a shorter dashed line thereof denotes a milder grain inclination.

According to the sixth aspect of the present invention, players can instantly and intuitively get, by the symbolized turf slope information and grain data, a clear picture of the turf surface with respect to a slope direction and/or slope angle, as well as an orientation and/or inclination of the grain at each of the measuring target points. Players are also allowed to get a clear picture of the grain condition at other points than the measuring target points by a processed image displayed in the background.

According to the seventh aspect of the present invention, players can immediately recognize a condition of the turf surface, at each of the measuring target points located along a line extending from the measurement starting point to the nearest cup location, by the number of arrows arranged in a tandem array where, in the direction of the arrows, a larger number of arrows denotes steeper slope in the turf and a fewer number of arrows denotes a milder slope in the turf.

According to the eighth aspect of the present invention, players are allowed to identify, on the screen image, symbolized images of the grain data and the turf slope information in a manner clearly distinguishable from each other.

According to the ninth aspect of the present invention, players can immediately determine a putting direction of a ball with a help of putting assist information on display.

According to the tenth aspect of the present invention, there can be prevented a direct collision between a putter and a mobile terminal with a help of a buffer mounted on the mobile terminal.

BRIEF DESCRIPTION OF THE DRAWINGS

FIG. 2 illustrates a display mode showing a screen image of the golf play assisting system in so-called general "putting assist" mode, wherein FIG. 2A illustrates so-called "slope assist", FIG. 2C illustrates so-called "grain assist" mode and FIG. 2B illustrates an advanced mode.

DETAILED DESCRIPTION OF THE PREFERRED EMBODIMENTS

An embodiment of the golf play assisting system of the present invention is described hereunder with reference to accompanying drawings.

Figure 1:
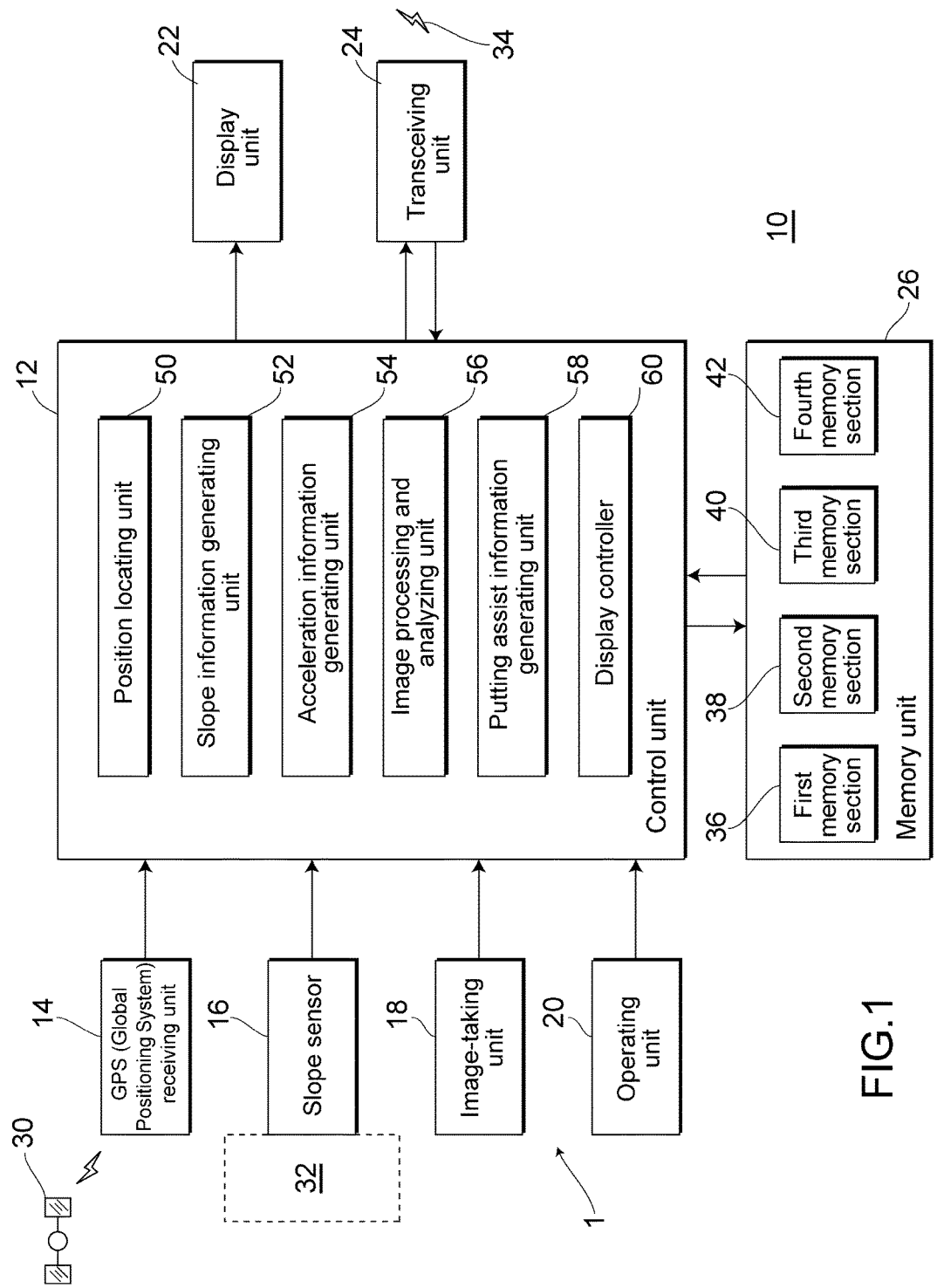
FIG. 1 is a block diagram describing an outline of an embodiment of a golf play assisting system according to the present invention.

FIG. 1 illustrate an outline of a mobile terminal 10 equipped with an embodiment of a golf play assisting system 1 of the present invention. In the beginning, described is the hardware configuration of the mobile terminal 10 held by a golf player as a user. The mobile terminal 10 includes a control unit 12, a GPS (Global Positioning System) receiving unit 14, a slope sensor 16, an image-taking unit 18, an operating unit 20, a display unit 22, a transceiving unit 24 and a memory unit 26.

The mobile terminal 10 here is a flat phone having a shape of a thin plate. Particularly, the mobile terminal 10 here can be operated by directly touching the surface of the display unit 22. Alternatively, there may be employed other apparatuses, such as: a cell phone having push buttons serving as an operating unit 20; a tablet terminal; a watch; or any other mobile information processing terminal.

The control unit 12 includes a CPU (Central Processing Unit), and has a software function for performing various types of arithmetic processing. This function will be later described in detail.

The GPS receiving unit 14 is installed as a location-detecting device for obtaining a current location of the mobile terminal 10. The GPS receiving unit 14 wirelessly receives radio waves from multiple satellites, such that the GPS receiving unit 14 calculates a three-dimensional location (latitude, longitude and altitude) of the mobile terminal 10, or the location of the player carrying the mobile terminal, and then sends such positioning data to the control unit 12. In fact, any other location detecting device than the GPS receiving unit 14 can be used as long as such device is able to detect the current location of the mobile terminal 10.

The slope sensor 16 is made up of a combination of an accelerometer and a geomagnetic sensor. The slope sensor 16 is installed as a direction and inclination detecting device that detects a direction/inclination in which the mobile terminal 10 is pointed/inclined, and then sends these detected data to the control unit 12. This slope sensor 16 is preferably of a semiconductor type for allowing the sensor 16 to be mounted on a small type of the mobile terminal 10, but there may be employed any other sensor as long as such devices are able to detect the direction and inclination thereof.

This slope sensor 16 also works as an accelerometer for estimating an acceleration of the ball to be hit by players. On the mobile terminal 10 is mounted, as a buffer, an assistive tool 32 in a detachable manner. When a player applies an impact of a putter to the assistive tool 32 on which the mobile terminal is attached, detected data of the acceleration information are retrieved, as an acceleration information of the putting for the player, from the slope sensor 16 into the control unit 12.

The image-taking unit 18 is provided as an image-taking device which shoots a still image of a target and then sends out electric data of the image to the control unit 12. The image-taking unit 18 has an objective lens (not shown) to which a shooting object is to be directed when a player pushes a button of the operating unit 20 (to be described later) for allowing the still image data (hereinafter referred to as original image data) to be retrieved into the control unit 12. Target objects taken by the image-taking unit 18 include, but are not limited to a surface of a target turf in a golf course. The original image data captured from the image-taking unit 18 go through image processing and image analysis performed by an image processing and analyzing unit 56 of the control unit 12 to be described hereinafter.

The operating unit 20 sends an electrical operation signal to the control unit 12 in response to an operation by the player. Specifically, the operating unit 20 can be made of a keyboard, a pointing device, a button(s) or the like, as well a transparent touch panel mounted on the surface of the display unit 22 to be described hereinafter. However, the operating unit 20 is not limited to these devices.

The display unit 22 has a function to show various types of information upon receiving a display control signal from the control unit 12. For example, the display unit 22 is made up of a liquid crystal module or liquid crystal panel that is exposed on the front surface of a main body of the mobile terminal 10. As is known in the art, these liquid crystal module and liquid crystal panel display information through a dot matrix with a great number of subpixels being arranged in a grid pattern.

The transceiving unit 24 enables a bidirectional communication between the mobile terminal 10 and an external device (not shown) through a wired or wireless communication tool 34. In this way, a variety of information pieces on a golf course on which players is playing can be retrieved from, for example, a center server as an external device through the communication tool 34 such as Internet, to the transceiving unit 24 of the mobile terminal 10, allowing a part or all of such information pieces to be displayed on the display unit 22 through the operation of the control unit 12.

The memory unit 26 is made up of various memory devices such as a magnetic hard disk device and a semiconductor memory device. The memory unit 26 includes a first memory section 36, a second memory section 38, a third memory section 40, and a fourth memory section 42. The first memory section 36 memorizes an measurement starting point, a nearest cup location and measuring target points, all of which are located by a position locating unit 50, which shall be described later. The second memory section 38 stores turf slope and/or acceleration information to be obtained based on detected data retrieved from the slope sensor 16. The third memory section 40 stores processed image data and/or grain data obtained based on original image data of a turf image shot by the image-taking unit 18. The fourth memory section 42 stores, as green-related data at each of the holes, locational information of the cups, and information on green speed and compaction. In addition to the above-described information and data, the memory unit 26 is able to read and write various data and programs based on the commands from the control unit 12.

Described hereunder is a software configuration of a program for operating the control unit 12. The control unit 12 is configured to read computer programs stored in the memory unit 26 in order to execute various functions as:

position locating unit 50, slope information generating unit 52, acceleration information generating unit 54, image processing and analyzing unit 56, putting assist information generating unit 58, and display controller 60.

The position locating unit 50 is configured in a manner such that, when the control unit 12 retrieves the original image data of the target turf, the position locating unit 50 identifies or locates a measurement starting point of the mobile terminal 10 by using positioning data retrieved from the GPS receiving unit 14. The position locating unit 50 then extracts locational information of the cup nearest to the measurement starting point, noted hereinafter as "nearest cup location", among green-related data stored in the fourth memory section 42. The position locating unit 50 serves to locate, as measuring target points, any locations along a line from the measurement starting point to the nearest cup location; and to determine whether or not the mobile terminal 10 is close enough to the identified measuring target points based on positioning data that are input from the GPS receiving unit 14. The measurement starting point, the nearest cup location, and the measuring target points are memorized in the first memory section 36 by the position locating unit 50 each time any one of these points or location is located.

The slope information generating unit 52 is configured in the following manner; that is, the slope information generating unit 52 sequentially retrieves positioning data from the GPS receiving unit 14 after the measuring target points are located by the position locating unit 50. When the mobile terminal 10 is determined to be placed on the turf surface located near to any one of the measuring target points whose locations are memorized in the first memory section 36, the slope information generating unit 52 generates turf slope information about slope direction and angle of the turf surface based on the detected data retrieved from the slope sensor 16. The turf slope information is then to be stored in the second memory section 38.

The acceleration information generating unit 54 is configured to generate putting acceleration information of a player and to store that information in the second memory section 38 based on the detected data retrieved from the slope sensor 16 when being hit by the putter with the assistive tool 32 mounted thereon. The acceleration information is generated in response to an impact applied to the slope sensor 16 of the mobile terminal 10 when a player putts the assistive tool 32 which is mounted on the mobile terminal 10. The assistive tool 32 is mounted as a buffer in order to avoid a direct collision of putter with the mobile terminal 10. The slope sensor 16 converts such impact into electrical detected data, which are then sent to the information generating unit 54. The acceleration information will be computed by the acceleration information generating unit 54 based on, e.g., the detected data retrieved from the slope sensor 16 and already-known elastic coefficients of the assistive tool 32.

Alternatively, without using the assistive tool 32 and/or the acceleration information generating unit 54, players may input the acceleration information of the putting directly from, e.g., the operating unit 20 of the mobile terminal 10. Obviously, the control unit 12 serves to store acceleration information input therefrom in the second memory section 38.

The image processing and analyzing unit 56 is configured not only to recognize a turf section in the original image, taken by the image-taking unit 18, and perform an image processing in order to produce processed image data visibly highlighting the grain, but also to obtain grain data, through image analysis of the turf section, indicating directions and/or inclinations of the grain at specific locations in the turf section, and store these processed image data and grain data in the third memory section 40.

Here, the term "specific locations" refers to a plurality of measuring target points located by the position locating unit 50, or correspond to a plurality of turf regions located around the nearest cup location, including at least any regions or points in a turf section whose original image data are capable of being analyzed.

The image processing and analyzing unit 56 generates the above-described processed image data by performing image processing for: contour enhancement; gray scale level adjustment; and/or contrast adjustment, against the original image data retrieved from the image-taking unit 18. The contour enhancement refers to a processing of detecting data, among original image data, with respect to a contour of the turf that is image-taken, to enhance the contour of the turf. The gray scale level/contrast adjustment refers to a processing of adjusting the gray scale level/contrast thereof. There may be contained in the image processing and analyzing unit 56 any other image processing functions capable of highlighting the condition of the grain in an easy-to-read manner.

The putting assist information generating unit 58 is configured to use not only turf slope information and acceleration information that are retrieved from the second memory section 38, and/or grain data retrieved from the third memory section 40, but also information regarding green speed and compaction contained in the green-related data that are stored in the fourth memory section 42. The putting assist information generating unit 58 utilizes the above-described information to estimate, as putting assist information, a trajectory of a ball to be rolled toward the nearest cup location from the measurement starting point when putted from the measurement starting point by the putter with which the assistive tool 32 is hit.

The display controller 60 is configured to symbolize grain data, retrieved at least from the third memory section 40, and display, on the display unit 22 in the display mode 10, the symbolized grain data, indicating directions and inclinations of the grain at specific locations, on top of the processed image at the specific locations highlighting grain whose image data are retrieved from the third memory section 40. The display controller 60 described herein also serves not only to symbolize the above-described grain data but also to symbolize the turf slope information retrieved from the second memory section 38 in order to display the symbolized turf slope information at the specific locations on top of the image indicating the processed image data.

In the present embodiment, in response to an operation signal from the operating unit 20 for changing a display mode, the display controller 60 switches the display mode of the display unit 22 to either one of: a general mode as a first mode displaying, on the image of the processed image data, both the symbolized grain data and the grain slope information; and a professional mode, as a second mode, displaying the symbolized grain data alone in such a manner as being superimposed on the image of the processed image data. Note that this display mode shall not be limited only to the above-described modes. That is, there may be employed, e.g., a single mode display mode only one of the first and second modes, or a display mode having a further mode in addition to the first and second modes.

FIGS. 2A, 2B, and 2C illustrate display modes where images of so-called "putting assist" mode, corresponding to the above-described general mode, are displayed on the display unit 20 by the display controller 60. Numeral 62 shown in FIG. 2B denotes a screen image of the "putting assist" mode, which is shown on the display unit 22. In this mode, a screen image 64 of so-called "slope assist" mode, as shown in FIG. 2A and a screen image 66 of so-called "grain assist" mode, as shown in FIG. 2C, where both of these modes are in general mode, are functionally combined with each other in order to establish an advanced mode.

As shown in each of the screen images 62, 64, and 66, as illustrated respectively in FIGS. 2A, 2B, and 2C, numeral 68 denotes a display portion of the processed image, or processed image background visibly highlighting the grain. The processed image background 68 is displayed all over the display area on display unit 22. Numeral 70 denotes a cup location indicator, which is denoted by a white circle as the nearest cup location on the processed image background 68. Numeral 72 denotes a first arrow indicator which is denoted by a line with an arrowhead, showing the direction of a straight path extending from the measurement starting point to the nearest cup location.

Provided on each of the screen images 62 and 64 are; a first slope indicator 74 that is denoted on the processed image background 68, indicating turf slope information at each of the measuring target points, which is stored in the second memory section 38; and a ball trajectory indicator 76 that is denoted by a line with an arrowhead and indicated on top of the processed image background 68, showing the putting assist information obtained in the putting assist information generating unit 58. The first slope indicator 74 indicates a slope direction and angle of the turf, at each of the measuring target points, by the image respectively corresponding to the direction and number of arrows arranged in a tandem array. That is, in each of the three measuring target points located along a line from the measurement starting point to the nearest cup location, players are allowed to recognize in an easy-to-read manner that a larger number of arrows signifies a steeper turf that is sloped in the direction of the arrows, and a fewer number of arrows signifies a milder sloped turf that is sloped in the direction of the arrowheads. Further, on the screen image 64, at each of the measuring target points, is provided a measuring target location indicator 78, as denoted by a black circle shown on the processed image background 68.

Further provided on each of the screen images 62 and 66 is a second slope indicator 80, as indicated on top of the processed image background 68, showing a direction and inclination of the grain at each of the measuring target points whose information is stored in the third memory section 40. The second slope indicator 80 displays a direction and inclination of the grain, at each of the measuring target points, by an arrow with an arrowhead and a broken line where a direction of the arrowhead signifies a direction in which the turf grass is oriented and a length of the broken line signifies a degree of the inclination. That is, in each of the three measuring target points located along a line from the measurement starting point to the nearest cup location, players are allowed to recognize in an easy-to-read manner that a longer broken line signifies more steeply inclined grain that is inclined (or tilted) in the direction of the arrowhead, and a shorter broken line signifies more mildly inclined grain that is inclined (or tilted) in the direction of the arrowhead.

The golf play assisting system 1 according to the present embodiment has a feature that the display controller 60 displays, on the display unit 22, the screen image 62 in the "putting assist" mode, as illustrated in FIG. 2B, when the general mode is selected by an input from the operating unit 20. Here, in place of the measuring target location indicator 78 as illustrated on the screen image 64 in the "slope assist" mode, on the screen image 62 is arranged a second slope indicator 80, displaying a symbolized grain data, around which a first slope indicator 74 is displayed. By virtue of this display mode, players are allowed to recognize, through the screen image 62 in an easy-to-read manner, a direction and/or inclination of the grain, along with a slope direction and angle of the turf surface, at any one of the measuring target points located between the location of the player who carries the mobile terminal 10 and the location of the cup. Further, on the screen image 62 is displayed the processed image background 68, as shown fully in the background, highlighting the grain of the original image taken by the image-taking unit 18. The processed image background 68 is created based on the original image data. In this way, players are allowed to recognize conditions of the grain, through the screen image 62, not only in the measuring target points but in any other places of the turf. Furthermore, on this screen image 62 is denoted a trajectory of a ball to be rolled toward the cup by a trajectory indicator 76, which may be utilized by the player to take advantage of making an immediate decision, based on the screen image 62, on the direction of the ball to be rolled.

Figure 3:
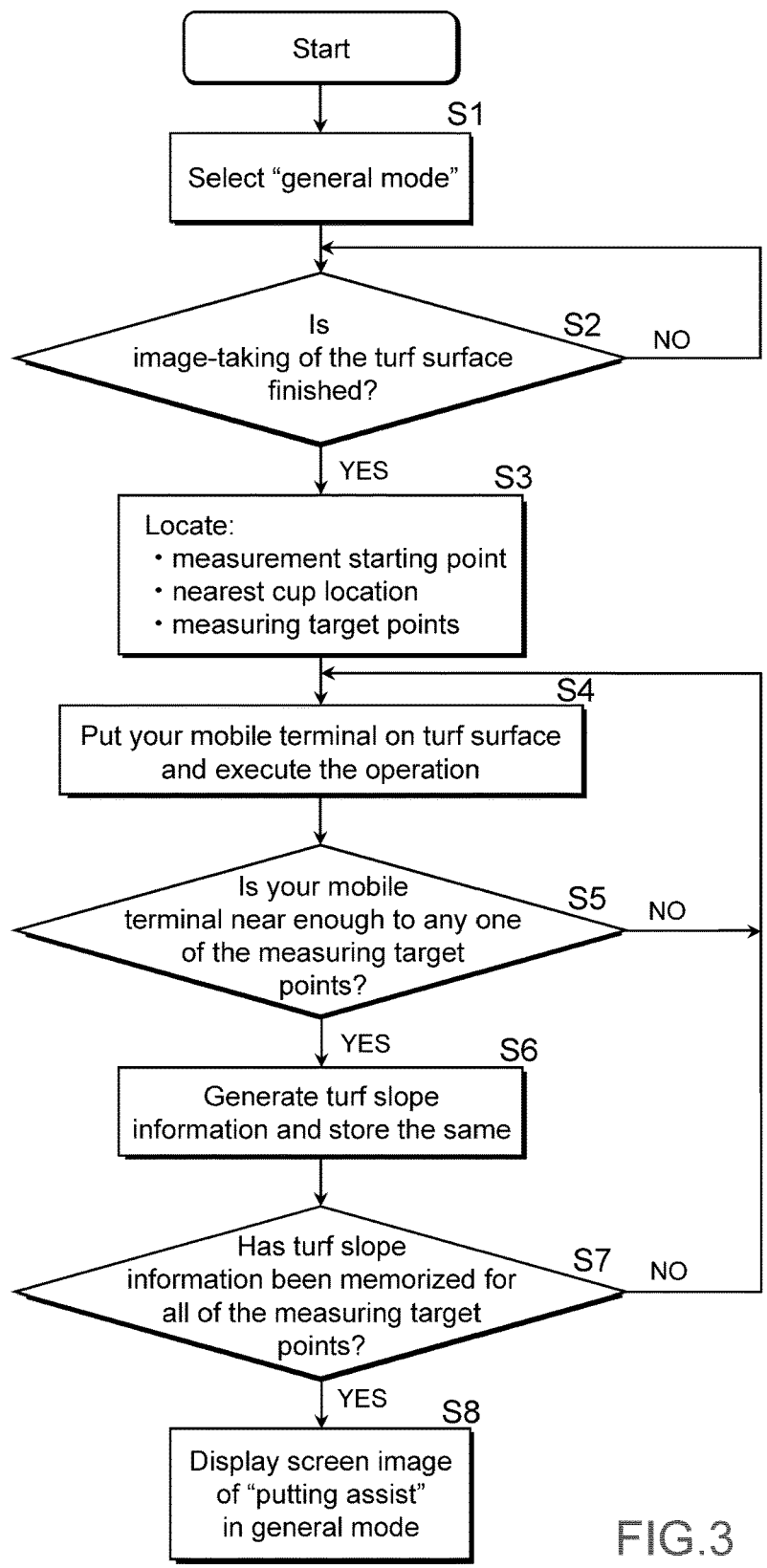
FIG. 3 is a flowchart illustrating a series of steps for displaying, on the display unit, a screen image in so-called "putting assist" mode.

Next is described, with reference to FIG. 3, a flowchart illustrating a series of steps for displaying the screen image 62 in the above-described "putting assist" mode. Note that in the steps to be explained hereinafter, acceleration information of the putting is assumed to be memorized in advance in the second memory section of the mobile terminal 10. Also, green-related data at each of the holes are assumed to be stored in advance in the fourth memory section 42. The green-related data may be input directly from the operating unit 20, or alternatively be retrieved from a center server through a communication tool 34 to the transceiving unit 24.

Once the mobile terminal 10 has been activated, then, in Step 1, when a player selects the general mode through the input operation of the operating unit 20, the display controller 60 displays, on the display unit 22, a screen image for letting the player shoot an image of a turf surface containing a cup. In Step S2, when the player carrying the mobile terminal 10 pushes a button of the operating unit 20 with its image-taking unit 18 being directed toward the cup in order to take a shot of the turf surface containing the cup, the image processing and analyzing unit 56 identifies a turf section among the original image data whose image is taken by the image-taking unit 18. The image processing and analyzing unit 56 then performs image processing for the turf section to create processed image data, highlighting the grain of the turf section, which are then stored in the third memory section 40.

Once the original image data are retrieved in the control unit 12, then, in Step S3, position locating unit 50 locates a position of the measurement starting point, corresponding to the shooting location of the mobile terminal 10, based on positioning data retrieved from the GPS receiving unit 14. The position locating unit 50 then identifies, as the nearest cup location, the location of a cup nearest to the measurement starting point, or shooting location of the mobile terminal 10, among the green-related data that are stored in the fourth memory section 42 in advance. In this way, the position locating unit 50 of the present embodiment can instantly recognize, among all of the cups of holes, the location of the cup around which the player is playing by using positioning data imported from the GPS receiving unit 14, each time the turf surface is taken by the image-taking device 18.

The position locating unit 50 then determines locations of equally spaced three positions, as measuring target points, along a straight line extending from the measurement starting point to the nearest cup location. The display controller 60 displays, on the display unit 22, the measuring target points, the nearest cup location, and/or the straight line extending from the measurement starting point to the nearest cup location, in such a manner as being superimposed on the processed image data after image processing, and players are allowed to receive an instruction on where to place the mobile terminal 10 on the turf surface in the following Step S4 in advance. This display mode is one corresponding to the screen image 64 of "slope assist" mode as illustrated in FIG. 2 without having any one of the first slope indicator 74 and the ball trajectory indicator 76.

In Step S4, the player manipulates the operating unit 20 to measure a slope direction and angle of the turf surface at the measuring target points, specified by the position locating unit 50 at Step S3, by placing the mobile terminal 10 on that turf surface. The player may alternatively manipulate the operating unit 20 by tapping any one of the measuring target location indicators 78 being displayed on the display unit 22. In Step S5, the acceleration information generating unit 54 retrieves positioning data via GPS receiving unit 14, and determines if the location on which the mobile terminal 10 is placed is in the vicinity of any one of the measuring target points; that is, within a predetermined radius from any one of the measuring target points. If the location on which the mobile terminal 10 is placed is not in the vicinity of any one of the measuring target points, Step S4 is to be repeated in order to perform measurements at proper location. If the location on which the mobile terminal 10 is placed is in the vicinity of any one of the measuring target points, then Step S6 is performed. In Step S6, the slope information generating unit 52 generates turf slope information, at the measuring target point, which is then stored in the second memory section 38.

In this way, the above-described processes of Step S4 to Step S6 will be repeated to generate the turf slope information indicating a slope direction and slope angle of the turf surface, at all of the measuring target points specified by the position locating unit 50. If the turf slope information at each of the measuring target points, indicating slope directions and angles of the turf surface, gets stored in the second memory section 38, then Step S8 will be performed. In step S8, display controller 60 displays a screen image 62 in "putting assist" mode on the display unit 22.

Figure 2:
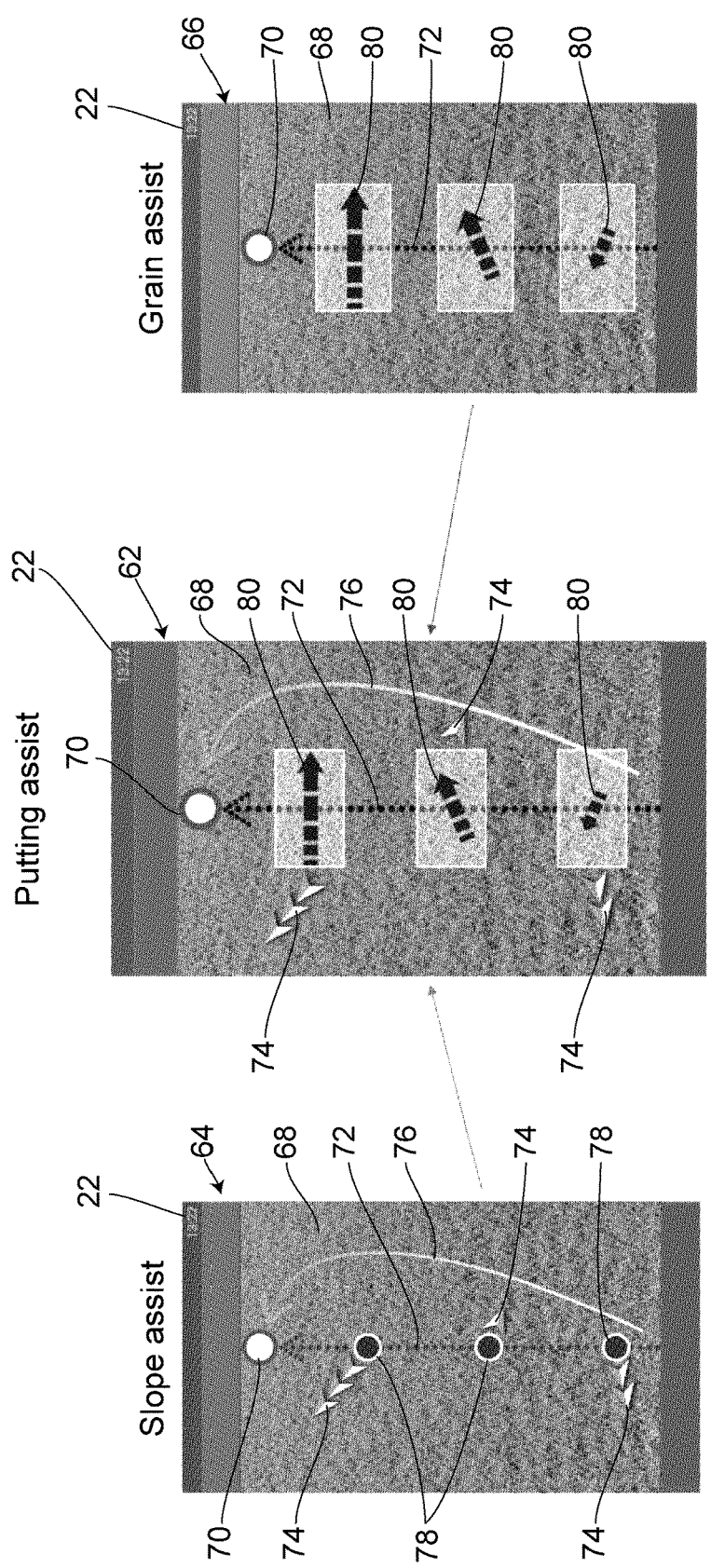

On the screen image 62 displayed by the display controller 60 are simultaneously displayed: the cup location indicator as located the nearest to the measurement starting point among a plurality of cups; the first arrow indicator 72 indicating a straight path extending from the measurement starting point toward the nearest cup location; the first slope indicator indicating turf slope information at each of the measuring target points; the ball trajectory indicator 76 indicating a trajectory of a ball to be rolled from the measurement starting point toward the nearest cup location; and the second slope indicator 80 indicating grain data at each of the measuring target points, the grain data obtained through image analysis of the original image data taken from the image-taking unit 18, where all of the indicators are symbolized on top of the processed image background 68 whose grain image is greatly highlighted as compared to the original image data shown in FIG. 2.

With the above descried steps, the screen image 62 in a general "putting assist" mode will be shown on the display unit 22, allowing players to get an intuitive picture of slope directions/angles of the turf surface, and/or of directions/orientations of the grain at each of the measuring target points with a help of symbolized images of the first slope indicator 74 and the second slope indicator 80. Players are further allowed to recognize the condition of the grain not only in the measuring target points but also in any other place of the turf, with a help of the processed image background 68 as shown in the background. Furthermore, players are allowed to make an instant decision on the direction of the ball to be rolled with a help of the trajectory indicator 76.

Alternatively, there may be employed another display mode for the screen image 62 in the "putting assist" mode shown in FIG. 2 such that the second slope indicators 80 are arranged around the first slope indicator 74. Furthermore, the first slope indicator 74 and the second slope indicator 80 may be displayed in different colors from each other in order to differentiate the symbolized grain data from the turf slope information in a visible manner. Furthermore, there may be employed various icons for the display modes of the first slope indicator 74 and the second slope indicator 80, without in any way being limited to those shown in FIG. 2.

Figure 4:
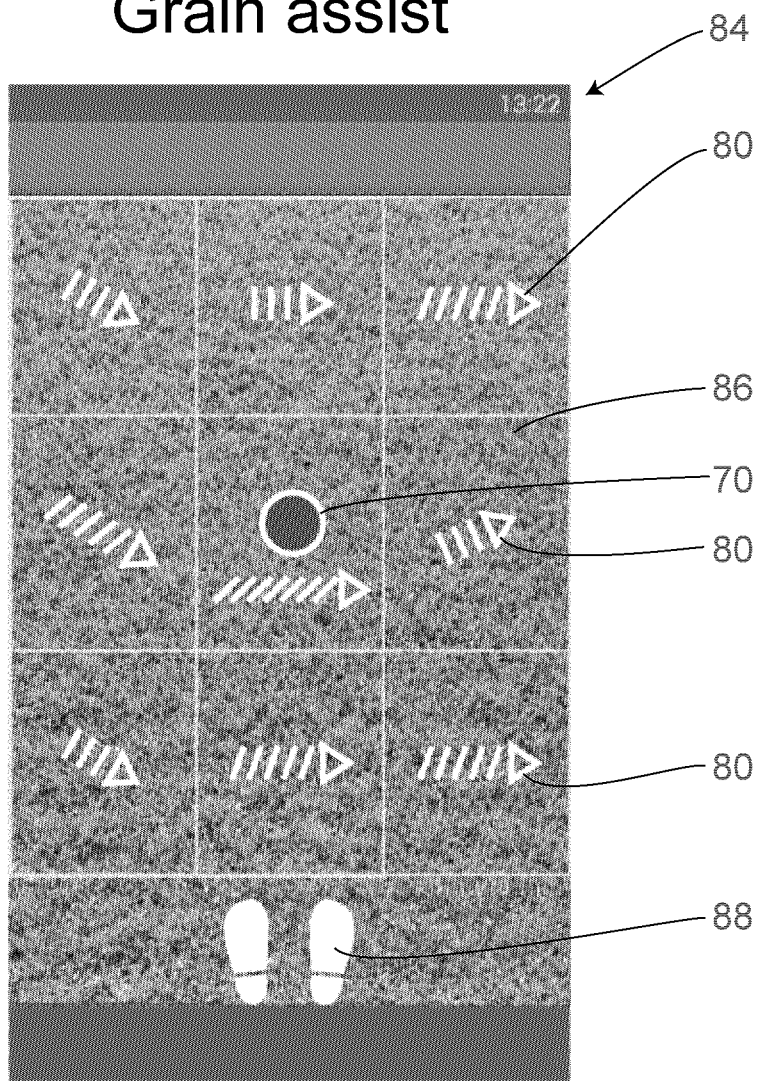
FIG. 4 illustrates a display mode displaying, on the display unit, a screen image of the golf play assisting system in a professional "putting assist" mode.

Next, a display mode for the "grain assist" mode, indicating a professional mode, will be described in great detail with reference to FIG. 4. FIG. 4 illustrates, on the display unit 22, a screen image 84 of so-called "grain assist" mode where a black circle indicates a cup location indicator 70 indicating the nearest cup location around which segmentation indicators 86 are arranged, on top of the processed image background 68, on a turf surface where the segmentation indicators 86 are made up of a combination of straight lines delimiting a plurality of segments (nine segments as for the display mode shown in FIG. 4.) Here, as with the screen image 62 in the "putting assist" mode, in each of the turf segment is arranged the second slope indicator 80 that is denoted by a triangular arrowhead and a plurality of bars arranged in parallel with each other, representing a symbolized image of grain data. Also, numeral 88 denotes a standing position indicator virtually representing a standing location of the player.

The "grain assist" display mode, as shown in the screen image 84, is a professional mode; that is, there will not be indicated any first slope indicator 74, indicating turf slope information thereof, or ball trajectory indicator 76, indicating a trajectory of the ball to be rolled, where both of the indicators are hidden from the screen unlike the general mode. Instead, there will be indicated, as the second slope indicator 80, symbolized images of grain data at each of the segments in the vicinity centering around the nearest cup location around which the player has an intention to play. Here, in each of the segments, players can instantly recognize that the larger the number of bars becomes and the more steeply the bars get inclined with respect to the direction of an arrow, then it indicates the grain more steeply inclined in the direction of the arrow, and that the fewer the number of bars becomes and more perpendicularly the bars are arranged with respect to the direction of an arrow, then it indicates the grain more mildly inclined in the direction of the arrow.

The display unit 22, displaying the screen images 62, 64 and 66 in the general mode or the screen image 84 in the professional mode, may be integrated into the flat and rectangular shaped mobile terminal 10 as a LCD display thereof. On the surface of the screen may be provided the operating unit 20 serving as a transparent touch panel. Here, on the display unit 22 in the general mode is provided a set of three indicators for each of: the first slope indicator 74, the measuring target location indicator 78, and the second slope indicator 80, all of which respectively correspond to the three measuring target points located by the position locating unit 50. In the professional mode, there is provided a set of nine indicators for the second slope indicator 80 corresponding to each of the nine turf segments identified by the image processing and analyzing unit 56. The number of these indicators 74, 78 and 80 may be changed in accordance with the number of the measuring target points and/or that of the turf segments.

Figure 5:
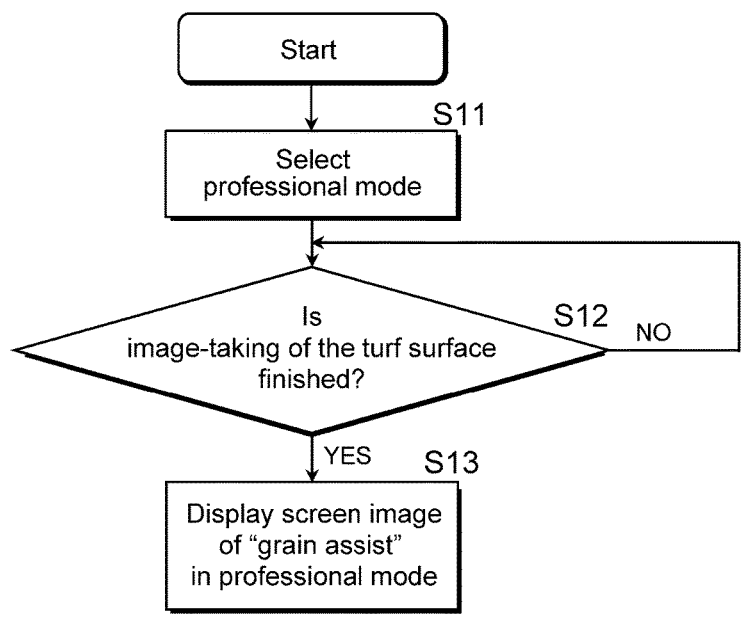
FIG. 5 is a flowchart illustrating a procedure up to the step where the screen image in the "grain assist" mode is displayed on the display unit.

Next is described, with reference to FIG. 5, a flowchart illustrating a series of steps for displaying the screen image 84 as shown in FIG. 4 in the above-described "grain assist" mode.

Once the mobile terminal 10 has been activated. Then, in Step 11, when a player selects the professional mode through the input operation of the operating unit 20, the display controller 60 displays, on the display unit 22, a screen image for letting the player shoot a turf surface image focusing on a cup. In Step S12, when the player, carrying a mobile terminal 10, pushes a button of the operating unit 20 with its image-taking unit 18 being directed toward the cup in order to take a shot, by the image-taking unit 18, of the turf surface with a focus on the cup, the image processing and analyzing unit 56 identifies a turf section among the original image data. The image processing and analyzing unit 56 then performs image processing for the turf section to create processed image data, highlighting the grain of the turf section, which are then stored in the third memory section 40. Further, the image processing and analyzing unit 56 generates turf slope information, based on an image analysis of the original data, indicating a slope direction and angle at each of the nine turf segments in the vicinity around a cup in the turf surface captured thereby, and then this turf slope information is stored in the second memory section 38.

This way, after the image processing and analyzing unit 56 has completed image processing and image analysis, the screen image 84 in the "grain assist" mode will be displayed on the display unit 22 by the display controller 60 in the following Step S13.

In Step 13 as illustrated in FIG. 4, on top of the processed image background 68, highlighting the grain thereof as compared to the original image data, are shown: the cup location indicator 70, indicating the nearest cup location; the second slope indicator, indicating grain data at each of the turf segments, which is obtained through image analysis of the original image data that are input from the image-taking unit 18; the segmentation indicators 86 delimiting the position of each turf segments; and the standing position indicator 88 virtually indicating a standing location of the player.

With the above descried steps, the screen image 84 in a professional "grain assist" mode will be shown on the display unit 22, allowing players to get an intuitive picture of a direction/inclination of the grain at each of the turf segments with a help of a displayed image of the second slope indicator 80, and players are further allowed to recognize the condition of the grain not only in the measuring target points but also in any other place in the turf, with a help of the processed image background 68 as shown in the background.

As an alternative display mode for the screen image 84 in the "grain assist" mode as shown in FIG. 4, the second slope indicator 80 may be indicated in a color variable in accordance with a degree at which the grain is inclined. Furthermore, there may be employed various icons for display modes of the second slope indicator 80, without in any way being limited to those shown in FIG. 4.

In this way, according to the present embodiment, the golf play assisting system uses the mobile terminal 10 equipped with the image taking unit 18, as an image-taking device, and contains the control unit 12 including:

the image processing and analyzing unit 56 that retrieves an original image data of a target turf from the image-taking device 18; allows an image of the target turf contained in the original image data to go through image processing and image analysis to obtain a processed image data of the target turf visibly highlighting a grain of the target turf; and obtains a grain data indicating directions and inclinations of the grain at two or more specific locations, such as measuring target points shown in the general mode, or turf segments shown in the professional mode, on the image of the target turf taken by the image-taking device 18; and the display controller 60 that symbolizes the grain data, obtained through performing image analysis in the image processing and analyzing unit 56, by the second slope indicator 80 denoted by, e.g., a line having an arrowhead, and then superimposes the symbolized grain data on the processed data, and then displays a resultant image data on the display unit 68 of the mobile terminal 10.

In this case, when an image of a portion of a turf is shot by a player to study the grain of the turf by using the image-taking device 10 of the mobile terminal 10, original image data of the image taken thereby go through image processing and image analysis. The second slope indicator 80, indicating the grain data which show a direction and inclination of the grain at each specific locations in the turf, are then displayed on the display unit 22 of the mobile terminal 10 on top of the processed image background 68 indicating the processed image data visibly highlighting the grain of the turf. Consequently, players are not only allowed to identify the characteristics of the grain all over the turf, with a help of the processed image data shown on the display unit 22, but also allowed to identify an orientation and inclination of the grain at any specific point of the turf surface with a help of the symbolized grain data, thus providing a golf play assisting system capable of assisting players with getting an intuitive picture of the condition of the grain.

Further, there is provided the slope information generating unit 52 that generates turf slope information indicating a slope direction and angle defined by a surface of the target turf on which the mobile terminal 10 is placed through data detected by a slope sensor, serving as an inclinometer, incorporated within the mobile terminal 10, wherein the display controller 60 is configured to symbolize the turf slope information at the two or more specific locations by the first slope indicator 74, such as an arrow, and display on the display unit 22 resultant symbolized turf slope information along with the second slope indicator 80 indicating the symbolized grain data.

In this case, players are allowed to identify, on the display unit 22, not only symbolized grain data, indicating directions and inclinations of the grain at two or more specific locations, displayed on top of display portion 68 of the processed image visibly highlighting the grain, but also turf slope information indicating a slope direction and a slope angle, indicated respectively by the first slope indicator 74 and the second slope indicator 80, on the turf surface at the two or more specific locations. Consequently, there is provided a golf play assisting system 1 enabling players to get an intuitive picture of the steepness of the turf slope as well as the condition of the grain.

Furthermore, according to another embodiment, the display controller 60 is configured to switch, in response to an operation signal from an operating unit of the mobile terminal, a display mode of the display unit 22 to either one of: a first mode, as a general mode, displaying both the symbolized grain data and the symbolized turf slope information on the processed image data; and a second mode, as a professional mode, displaying only the symbolized grain data on the processed image data.

In this case, display mode of the display unit 22 is allowed to be switched to either one of a general mode, as a first mode, and a professional modem, as a second mode, in accordance with their skill levels of players.

The present invention shall not be limited to the embodiments described above. In fact, various modifications can be made to such embodiments without departing from the gist of the present invention. For example, the image processor 44, as described in the above embodiments, may have any other functions or means than contour enhancement; gray scale level adjustment; and/or contrast adjustment, as long as the image processor 44 is capable of highlighting the grain in an easy-to-read manner. Further, the control unit 12 may be functionally integrated not into the mobile terminal 10 but into the center server. In this case, the control unit 12 communicates a variety of data or information pieces via the transceiving unit 24, but essential functions thereof are substantially the same as those already described. Further, in the embodiments described above, general and professional modes have been explained as functional modes for the golf play assisting system 1, but modes to be employed in the invention are not limited thereto.

What is claimed:

1. A golf play assisting system using a mobile terminal equipped with an image-taking device and a display unit, comprising:
   an image processing and analyzing unit that retrieves an original image data of a target turf from the image-taking device; allows an image of the target turf contained in the original image data to go through image processing and image analysis to obtain processed image data of the target turf visibly highlighting a grain of the target turf; and
   obtains grain data indicating directions and inclinations of the grain at two or more specific locations on the target turf in the original image taken by the image-taking device;
   a display controller superimposing the grain data on the processed image data with the grain data being symbolized and then displaying a resultant image data on the display unit of the mobile terminal; and
   a position locating unit that locates:
   a measurement starting point corresponding to a point where the original image was taken by the mobile terminal;
   a nearest cup location as located nearest to said measurement starting point among a plurality of cups; and
   two or more measuring target points located along a straight line extending from said measurement starting point to said nearest cup location, through a positioning data obtained from a location detector incorporated in the mobile terminal upon retrieval of the original image data from the image-taking device, wherein said image processing and analyzing unit is configured to obtain the grain data at each of the measuring target points located by the position-locating unit as said specific locations.

2. The golf play assisting system according to claim 1, further comprising a slope information generating unit generating turf slope information indicating a slope direction and angle defined by a surface of the target turf on which the mobile terminal is placed through data detected by an inclinometer incorporated within the mobile terminal, wherein said display controller is configured to symbolize the turf slope information at said two or more specific locations and display resultant symbolized information along with the grain data.

3. The golf play assisting system according to claim 2, wherein said display controller is configured to switch, in response to an operation signal from an operating unit of the mobile terminal, a display mode of said display unit to either one of:
   a first mode displaying both the symbolized grain data and the symbolized turf slope information on the processed image data; and
   a second mode displaying only the symbolized grain data on the processed image data.

4. The golf play assisting system according to claim 1, wherein said display controller is configured to display an arrow as the symbolized grain data at each of the measuring target points such that a direction of the arrow indicates an orientation in which a turf grass extends and a length of the arrow indicates an inclination of the turf grass.

5. The golf play assisting system according to claim 4, further comprising a slope information generating unit that sequentially retrieves positioning data from said location detector when the mobile terminal is placed on the surface of the target turf after the measuring target points are located by the position-locating unit; and generates turf slope information indicating a slope direction and angle defined by a surface of the target turf on which the mobile terminal is placed through data detected by an inclinometer incorporated within the mobile terminal if the mobile terminal is within a predetermined radius from any one of the measuring target points,
   wherein said display controller is configured to symbolize the turf slope information at each of the measuring target points and display resultant symbolized information along with the grain data.

6. The golf play assisting system according to claim 5, wherein said display controller is configured to display one or more arrows arranged in a tandem array as the symbolized turf slope information at each of the measuring target points such that the direction of the arrows indicates slope direction of the turf surface viewed at each of the measuring target points and the number of the arrows indicates the slope angle of the turf surface.

7. The golf play assisting system according to claim 6, wherein said display controller is configured to display the symbolized turf slope information and the symbolized grain data in different colors from each other.

8. The golf play assisting system according to claim 6, further comprising:
   an acceleration information generating unit generating acceleration information at the time of putting, through data detected by the inclinometer when the mobile terminal is hit by a putter; and
   a putting assist information generating unit estimating, as putting assist information, a trajectory of a ball to be rolled toward the nearest cup location when the ball is putted from the measurement starting point, by utilizing information about green speed and compaction, in addition to the turf slope information, the acceleration information, and the grain data, wherein said display controller is configured to simultaneously superimpose and display, on the processed image data, the symbolized nearest cup location; a straight line extending from the measurement starting point to the nearest cup location; the turf slope information and the grain data at each of the measuring target points; and the putting assist information indicating a trajectory of a ball to be rolled from the measurement starting point toward the nearest cup location.

9. The golf play assisting system according to claim 8, further comprising a buffer to be hit by the putter, said buffer being mounted on the mobile terminal.

\* \* \* \* \*